United States Patent

Yano

(10) Patent No.: US 9,633,285 B2
(45) Date of Patent: Apr. 25, 2017

(54) IMAGE FORMING APPARATUS THAT PERFORMS COLOR MISREGISTRATION CORRECTION OR DENSITY CORRECTION

(71) Applicant: CANON KABUSHIKI KAISHA, Tokyo (JP)

(72) Inventor: Takashi Yano, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/696,825

(22) Filed: Apr. 27, 2015

(65) Prior Publication Data

US 2015/0317548 A1    Nov. 5, 2015

(30) Foreign Application Priority Data

Apr. 30, 2014  (JP) .................. 2014-094046

(51) Int. Cl.
| | |
|---|---|
| *H04N 1/60* | (2006.01) |
| *G06K 9/00* | (2006.01) |
| *G03F 3/08* | (2006.01) |
| *G06T 5/00* | (2006.01) |
| *G06K 15/02* | (2006.01) |
| *B41J 29/393* | (2006.01) |

(52) U.S. Cl.
CPC ............ *G06K 15/02* (2013.01); *B41J 29/393* (2013.01); *G06K 15/027* (2013.01); *G06K 15/1867* (2013.01)

(58) Field of Classification Search
None
See application file for complete search history.

(56) References Cited

U.S. PATENT DOCUMENTS

| | | | | |
|---|---|---|---|---|
| 4,641,352 A | * | 2/1987 | Fenster | .................. G06T 5/006 382/130 |
| 5,610,999 A | * | 3/1997 | Bannai | .................. G06T 7/0083 358/3.19 |
| 6,215,968 B1 | * | 4/2001 | Uehara | ................ H04N 1/4078 358/3.21 |

(Continued)

FOREIGN PATENT DOCUMENTS

| | | |
|---|---|---|
| JP | 09-171275 A | 6/1997 |
| JP | 2003-207976 A | 7/2003 |

(Continued)

*Primary Examiner* — Madelein Nguyen
(74) *Attorney, Agent, or Firm* — Fitzpatrick, Cella, Harper & Scinto

(57) ABSTRACT

An image forming apparatus includes: a first correction unit configured to obtain a measurement value of a correction amount based on a detection result by a detection unit, and correct an image forming condition based on the measurement value; a second correction unit configured to obtain a variation value by a prediction calculation at a predetermined timing, obtain a prediction value by accumulating the variation value since the first correction unit performed the correction, and correct the image forming condition based on the prediction value, the variation value being a estimated value of the correction amount; and a determination unit configured to obtain an evaluation value related to a prediction error based on the variation value since the first correction unit performed the correction, and determine, based on the evaluation value, the correction timing by the first correction unit.

20 Claims, 8 Drawing Sheets

(56) References Cited

U.S. PATENT DOCUMENTS

| | | | | |
|---|---|---|---|---|
| 6,504,949 B2* | 1/2003 | Matsukubo | G06K 15/02 | 382/119 |
| 7,365,880 B2* | 4/2008 | Yamamoto | H04N 1/40062 | 358/1.9 |
| 7,590,364 B2* | 9/2009 | Takezawa | G03G 15/0194 | 399/49 |
| 8,107,833 B2* | 1/2012 | Yoshida | G03G 15/0131 | 347/116 |
| 8,270,857 B2 | 9/2012 | Saitou et al. | | |
| 8,305,637 B2* | 11/2012 | Shinohara | G03G 15/0131 | 347/103 |
| 8,339,656 B2* | 12/2012 | Komiya | G03G 15/043 | 358/1.12 |
| 8,600,274 B2* | 12/2013 | Uchiyama | G03G 15/0131 | 347/116 |
| 8,659,809 B2* | 2/2014 | Watanabe | G03G 15/0131 | 358/1.18 |
| 8,687,986 B2* | 4/2014 | Okanishi | G03G 15/1605 | 399/397 |
| 8,995,892 B2* | 3/2015 | Sato | G03G 15/50 | 399/301 |
| 9,091,953 B2* | 7/2015 | Nanai | G03G 15/5058 | |
| 9,235,179 B2* | 1/2016 | Watanabe | G03G 15/5058 | |
| 9,488,945 B2* | 11/2016 | Ishida | G03G 15/5033 | |
| 2003/0227638 A1* | 12/2003 | Draaisma | H04N 1/52 | 358/1.9 |
| 2006/0290767 A1* | 12/2006 | Tezuka | G03G 15/0142 | 347/115 |
| 2007/0046961 A1* | 3/2007 | Kashibuchi | H04N 1/52 | 358/1.9 |
| 2007/0046995 A1* | 3/2007 | Toda | G06F 3/1204 | 358/1.16 |
| 2009/0034029 A1* | 2/2009 | Nakamura | H04N 1/506 | 358/505 |
| 2009/0059323 A1* | 3/2009 | Ido | H04N 1/58 | 358/512 |
| 2009/0297190 A1* | 12/2009 | Kinukawa | G03G 15/1605 | 399/49 |
| 2009/0297191 A1* | 12/2009 | Hirai | G03G 15/1605 | 399/49 |
| 2010/0103442 A1* | 4/2010 | Saiki | G06K 15/129 | 358/1.9 |
| 2011/0116115 A1* | 5/2011 | Kawatoko | H04N 1/4052 | 358/1.9 |
| 2012/0033240 A1* | 2/2012 | Kim | H04N 1/58 | 358/1.9 |
| 2012/0107009 A1* | 5/2012 | Yano | G03G 21/206 | 399/92 |
| 2013/0089345 A1* | 4/2013 | Ohkubo | G03G 15/5033 | 399/49 |
| 2013/0164006 A1* | 6/2013 | Suzuki | G03G 15/0189 | 399/49 |
| 2013/0265613 A1* | 10/2013 | Yamazaki | G03G 15/01 | 358/3.06 |
| 2013/0293928 A1* | 11/2013 | Kashibuchi | G06K 15/1881 | 358/3.06 |
| 2013/0302049 A1* | 11/2013 | Nakagawa | G03G 15/5062 | 399/49 |
| 2013/0302050 A1* | 11/2013 | Shimba | G03G 15/0189 | 399/49 |
| 2014/0168672 A1* | 6/2014 | Haruta | H04N 1/58 | 358/1.9 |
| 2014/0314433 A1* | 10/2014 | Yamashita | G03G 15/0189 | 399/49 |
| 2016/0147175 A1* | 5/2016 | Ohkubo | G03G 15/0189 | 399/301 |

FOREIGN PATENT DOCUMENTS

| | | |
|---|---|---|
| JP | 2005-010450 A | 1/2005 |
| JP | 2005-165220 A | 6/2005 |
| JP | 2005-181788 A | 7/2005 |
| JP | 2010-141463 A | 6/2010 |
| JP | 2010-217544 A | 9/2010 |
| JP | 2011-133845 A | 7/2011 |

* cited by examiner

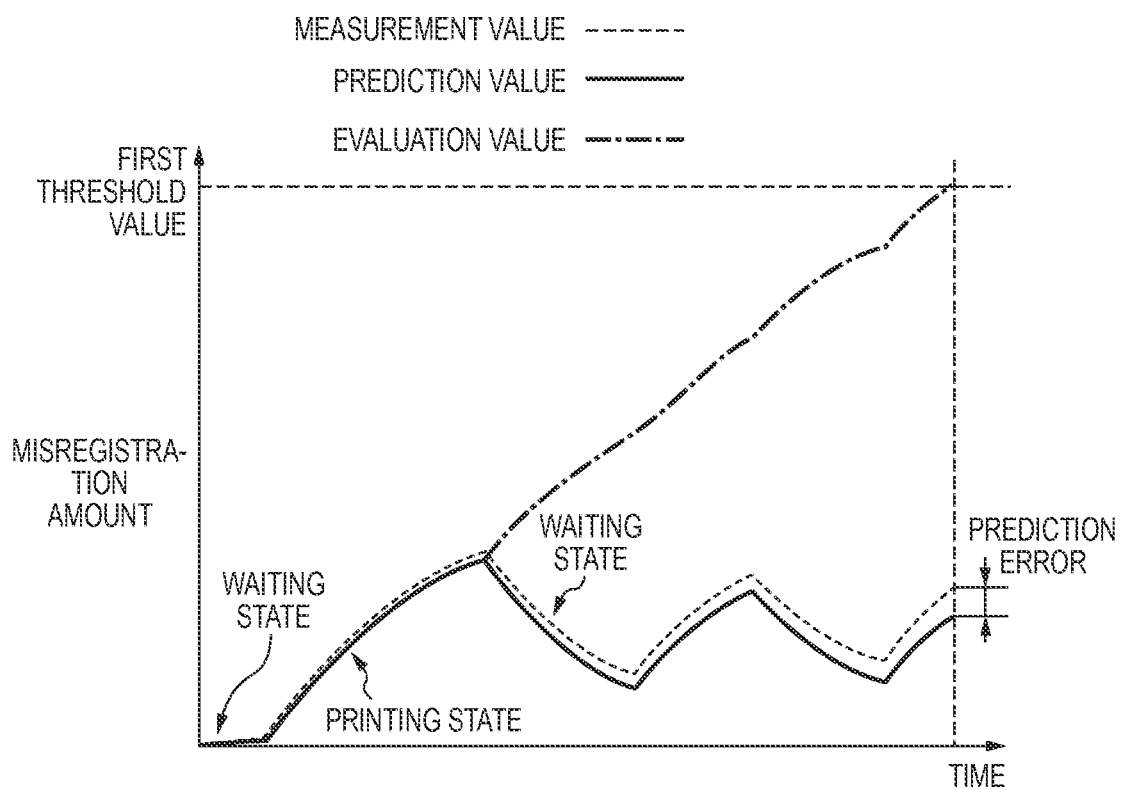

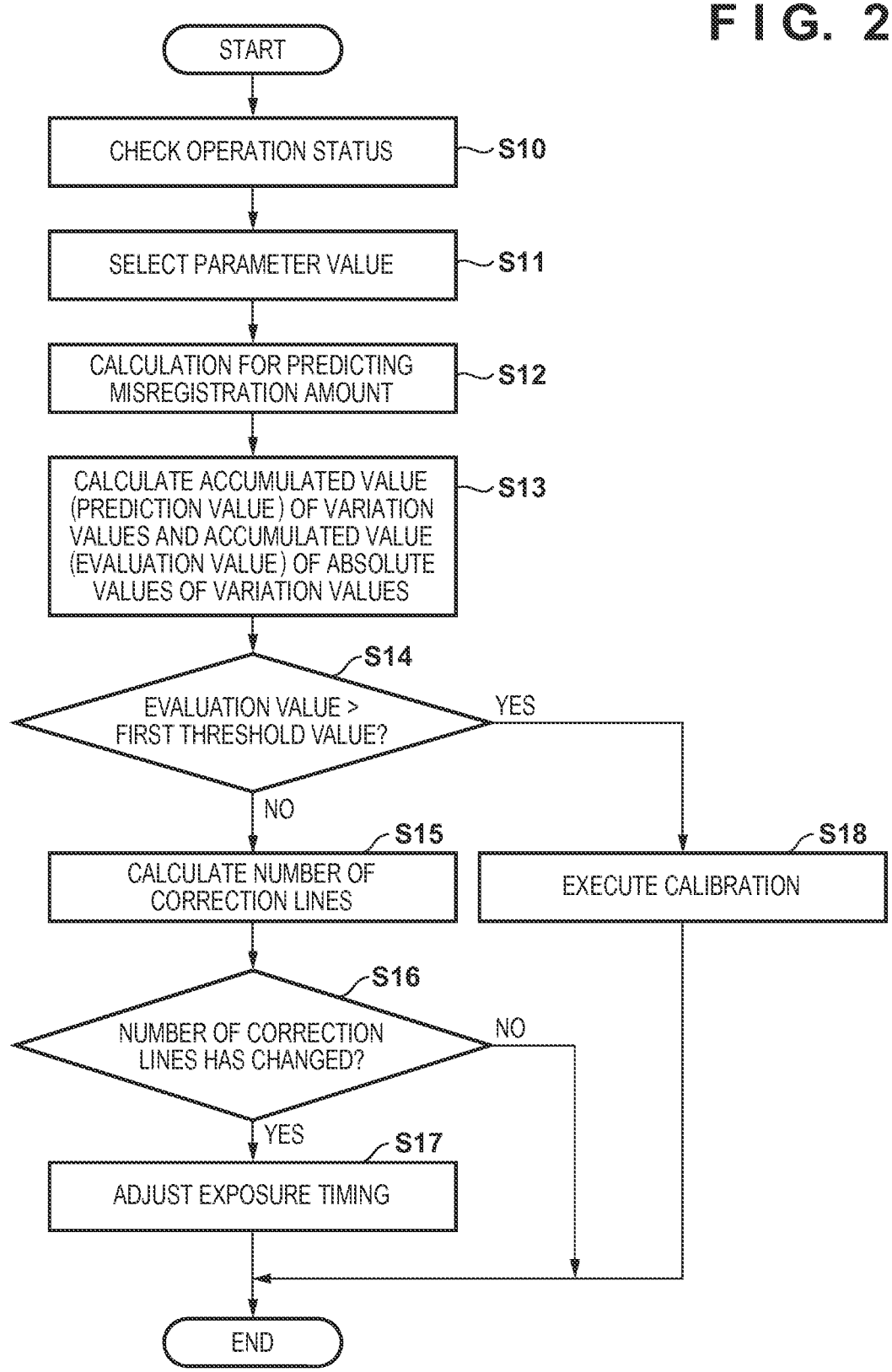

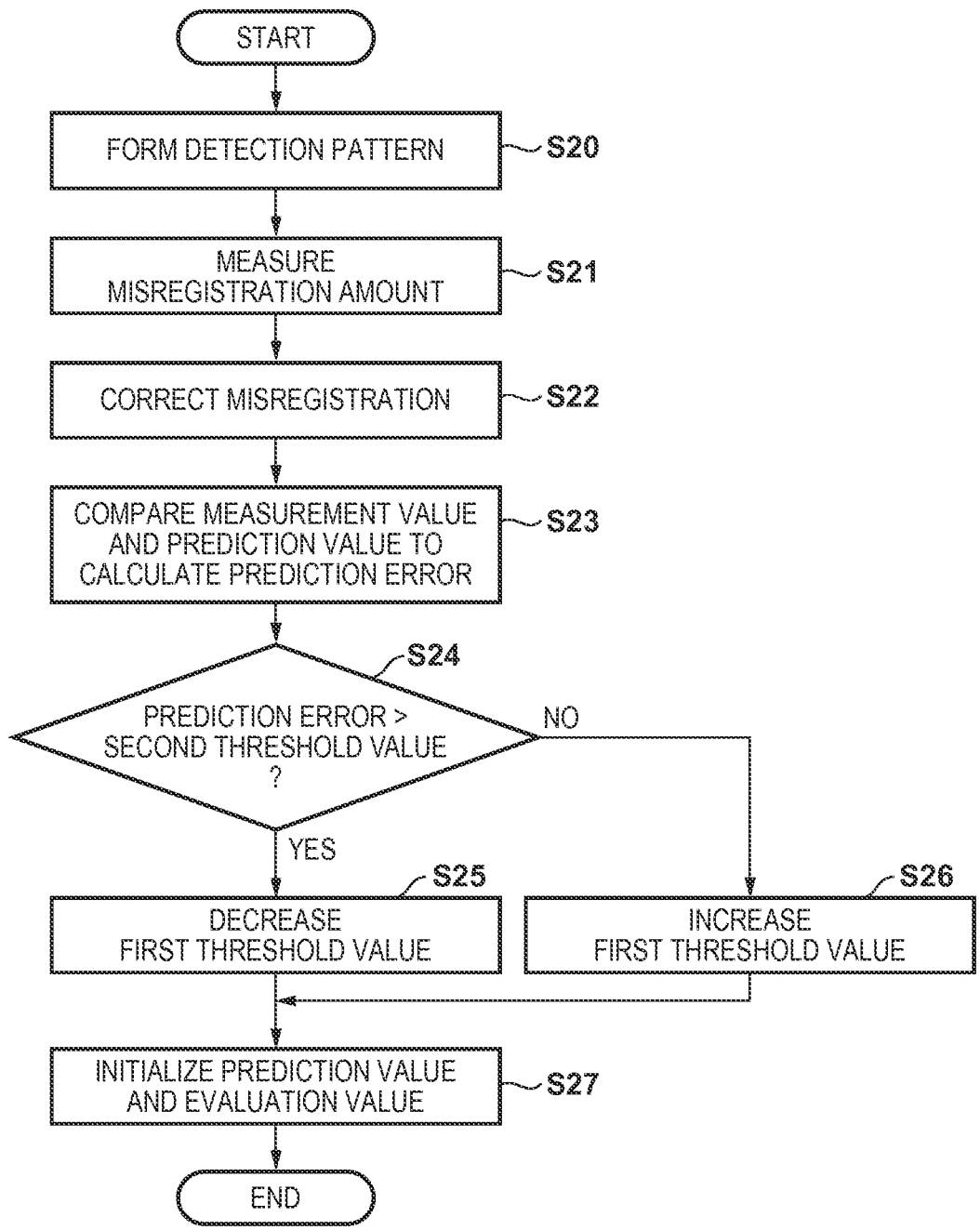

IMAGE FORMING APPARATUS THAT PERFORMS COLOR MISREGISTRATION CORRECTION OR DENSITY CORRECTION

BACKGROUND OF THE INVENTION

Field of the Invention

This disclosure relates to image quality control in an image forming apparatus.

Description of the Related Art

In an image forming apparatus that forms a multi-color image by overlaying toner images of a plurality of colors, a misregistration may possibly occur due to a shift of relative positions of the toner images. One of the factors in a misregistration is a variation of a light irradiation position on a photosensitive member caused by deformation due to the temperature of an optical member. For example, in a configuration in which a polygon mirror is rotated to scan the photosensitive member, the position or posture of an optical member changes due to heat generated by a motor for driving the polygon mirror or heat from peripheral members, and the light irradiation position varies. This variation usually differs among image forming units that form toner images of respective colors, and therefore a misregistration occurs.

For this reason, the image forming apparatus performs calibration for correcting a misregistration. Specifically, a detection pattern for detecting a misregistration amount is formed, the misregistration amount that has occurred is measured by detecting this detection pattern, and an image forming condition is adjusted so as to reduce the misregistration. Printing cannot be performed during calibration, and accordingly the period of calibration is downtime for a user. Moreover, if calibration is frequently performed, each member related to image formation deteriorates, and toner is consumed. Accordingly, the execution frequency of calibration needs to be appropriately set.

Japanese Patent Laid-Open No. 2010-141463 discloses that a calibration execution condition is changed in accordance with a state of use of an image forming apparatus. Japanese Patent Laid-Open No. 2003-207976 discloses that the number of times that calibration is executed is reduced by using both calibration and control for correcting a laser irradiation position based on prediction. Japanese Patent Laid-Open No. 2010-217544 discloses a configuration in which the misregistration amount that has occurred is predicted based on the output of a temperature sensor provided in an image forming apparatus, and calibration is performed in accordance with a prediction result. Specifically, it is disclosed that, if the amount of a temperature change since the previous calibration or the previous prediction is smaller than a threshold value, misregistration correction is performed using a predicted misregistration amount, and calibration is performed if the amount of the temperature change exceeds the threshold value.

An error occurs in a predicted misregistration amount. Accordingly, with a configuration in which the misregistration amount based on a prediction is also used, checking a difference between a prediction value and a measurement value, i.e., a prediction error is important. However, in the configuration of Japanese Patent Laid-Open No. 2010-217544, calibration is not executed unless the amount of a temperature change exceeds the threshold value. That is to say, the misregistration amount that has actually occurred is not measured, and the prediction error cannot be evaluated. In this case, it may be possible that the prediction error has actually become large, and the quality of a formed image has been degraded. Furthermore, the prediction error also varies in accordance with progress of the operation state. For example, FIG. 8A shows an exemplary relationship between the prediction value and the measurement value of a misregistration in the case where an apparatus enters a printing state after a long waiting state, and FIG. 8B shows an exemplary relationship between the prediction value and the measurement value in the case where the printing state and the waiting state are frequently alternated. As shown in FIGS. 8A and 8B, the prediction error after a lapse of the same time differs depending on the operation state of the image forming apparatus. This is because, in general, the prediction error tends to be larger as the prediction value increases and decreases more frequently. However, in Japanese Patent Laid-Open No. 2010-217544, execution of calibration is determined while considering only the amount of a temperature change since the previous calibration or the previous prediction, whereas the operation state is not considered, and the quality of a formed image may possibly be degraded.

SUMMARY OF THE INVENTION

According to an aspect of the present invention, an image forming apparatus includes: an image forming unit configured to form an image on an image carrier, using a plurality of colors; a detection unit configured to detect a detection pattern formed by the image forming unit; a first correction unit configured to obtain a measurement value of a correction amount to be used for correcting an image forming condition based on a detection result by the detection unit, and correct the image forming condition based on the measurement value; a second correction unit configured to obtain a variation value by a prediction calculation at a predetermined timing, obtain a prediction value by accumulating the variation value since the first correction unit performed the correction, and correct the image forming condition based on the prediction value, the variation value being an estimated value of the correction amount; and a determination unit configured to obtain an evaluation value related to a prediction error and used to determine a correction timing by the first correction unit based on the variation value since the first correction unit performed the correction, and determine, based on the evaluation value, the correction timing by the first correction unit.

Further features of the present invention will become apparent from the following description of exemplary embodiments with reference to the attached drawings.

BRIEF DESCRIPTION OF THE DRAWINGS

FIG. 1 is a diagram showing a relationship between an evaluation value, a prediction value, and a measurement value according to an embodiment.

FIG. 2 is a flowchart of misregistration correction according to an embodiment.

FIG. 4 is a flowchart of calibration according to an embodiment.

DESCRIPTION OF THE EMBODIMENTS

Hereinafter, exemplary embodiments of the present invention will be described with reference to the drawings. Note that the following embodiments are examples, and are not intended to limit the present invention to the content of the embodiments. Constituent elements that are not necessary for the description of the embodiments will be omitted in the diagrams used below.

First Embodiment

Figure 6:
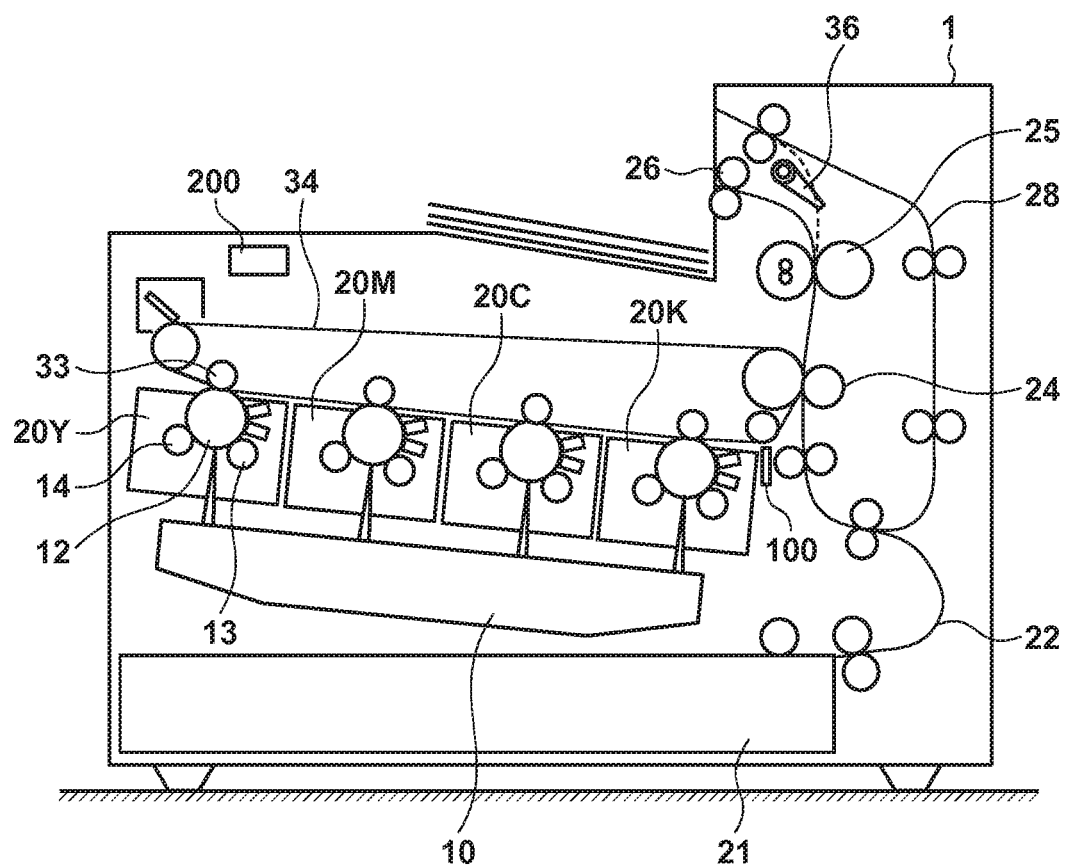
FIG. 6 is a diagram showing a configuration of an image forming apparatus according to an embodiment.

FIG. 6 is a schematic diagram showing a configuration of an image forming apparatus 1 according to the present embodiment. Image forming units 20Y, 20M, 20C, and 20K form toner images of yellow, magenta, cyan, and black, respectively, and transfer the toner images to an intermediate transfer belt 34. Note that the image forming units 20Y, 20M, 20C, and 20K have the same configuration, except the toner color to use. Accordingly, an operation of the image forming unit 20Y forming a toner image and transferring it onto the intermediate transfer belt 34 will be described below as a representative operation. A charging unit 13 charges a surface of a photosensitive member 12 that is driven to rotate, at a uniform potential. An optical unit 10 scans and exposes the charged surface of the photosensitive member 12 with a light beam corresponding to an image to be formed, and forms an electrostatic latent image on the photosensitive member 12. A developing unit 14 develops the electrostatic latent image on the photosensitive member 12 using toner and forms a toner image. A primary transfer roller 33 transfers the toner image on the photosensitive member 12 onto the intermediate transfer belt 34, which is an image carrier, by applying primary transfer bias. Note that a multi-color toner image is formed by transferring the toner images formed by the image forming units 20Y, 20M, 20C, and 20K onto the intermediate transfer belt 34 in an overlapped manner.

The intermediate transfer belt 34 is driven to rotate, and conveys the toner image that has been transferred onto the surface thereof to a position facing a secondary transfer roller 24. A recording medium contained in a cassette 21 is conveyed through a conveyance path 22 by rollers, and is guided to a nip area between the intermediate transfer belt 34 and the secondary transfer roller 24. The secondary transfer roller 24 outputs secondary transfer bias to transfer the toner image on the intermediate transfer belt 34 onto the recording medium conveyed through the conveyance path 22. The recording medium onto which the toner image has been transferred is conveyed to a fixing unit 25, and the toner image is fixed by the fixing unit 25. In the case of printing only on a single face of the recording medium, the recording medium is discharged, after the fixation of the toner image, to the outside of the apparatus by a discharge roller 26. On the other hand, in the case of printing on both faces of the recording medium, the position of a flapper 36 is switched such that the recording medium is guided to an inversion path 28 through a passage denoted by a dotted line in the drawing. Thereafter, the recording medium is again returned to the conveyance path 22 from the inversion path 28, and a toner image is transferred onto the other face.

The control unit 200 performs various kinds of control including control of image formation performed by the image forming apparatus 1 and control for maintaining the quality of an image to be formed. Sensors 100 (detection unit) for detecting a detection pattern are provided at a position facing the intermediate transfer belt 34. Note that, in the present embodiment, a detection pattern is for measuring the misregistration amount. Two sensors 100 are provided in a direction orthogonal to a moving direction of the surface of the intermediate transfer belt 34. Note that a known method can be used regarding an arrangement of the detection pattern and calculation of the misregistration amount using the detection pattern, and a description thereof will be omitted since it is not necessary for the description of the present embodiment.

FIG. 2 is a flowchart of control related to misregistration correction executed by the control unit 200 in the present embodiment, the control unit 200 performing the functions of correction and determination units. The control unit 200 repeats the processing in FIG. 2 at predetermined timings. These predetermined timings may be periodic, for example. Initially, in step S10, the control unit 200 checks the current operation state. Here, the operation state refers to an operation state of the image forming apparatus, such as a waiting state, a power-saving state, or a printing state. Note that the waiting state is a state where the apparatus is waiting for execution of printing in a state of being able to immediately start printing, and the power-saving state is a state where the apparatus is waiting for execution of printing and power supply to some members is stopped in order to reduce the power consumption. The printing state is a state where the apparatus is performing printing. Furthermore, in the case of changing the process speed for printing due to a difference in the type of a print target recording medium or the like, a plurality of states may be provided as the printing state in accordance with the speed to be used. Note that the aforementioned operation states are examples, and any state may be defined to predict the misregistration amount.

In step S11, the control unit 200 selects an algorithm for predicting the misregistration amount or a parameter of the algorithm, based on the current operation state, and in step S12, the control unit 200 performs calculation for predicting the misregistration amount to obtain a variation value of the misregistration amount since the previous prediction. In step S13, the control unit 200 calculates and acquires an accumulated value (hereinafter referred to as a "prediction value") of this variation value while considering the positive and negative of the variation value, and an accumulated value (hereinafter referred to simply as an evaluation value) of the absolute value of the variation value. Here, the prediction value, which is obtained while considering the positive and negative, is a prediction value of the misregistration amount, with the misregistration amount at the time of the previous calibration as reference. In the calibration, misregistration correction is performed using the misregistration amount measured by actually forming the detection pattern, and therefore the misregistration amount after the calibration is substantially zero. Accordingly, the prediction value indicates a predicted current misregistration amount. Note that the parameter and the algorithm for obtaining the variation value of the misregistration amount are stored in a nonvolatile memory within the control unit 200. The control unit 200 can store the prediction value and the evaluation value in the nonvolatile memory. In this case, even if the image forming apparatus is temporarily powered off and thereafter powered on, the evaluation value and the prediction value before the power-off can be used.

In step S14, the control unit 200 determines whether the evaluation value exceeds a first threshold value, and if so, in step S18, calibration is executed. Note that, although the details of the processing in step S18 will be described later, calibration in the present embodiment means misregistration correction control performed by actually obtaining the misregistration amount using the detection pattern. Upon calibration being executed in step S18, the evaluation value and the prediction value are initialized to zero. On the other hand, if the evaluation value does not exceed the first threshold value in step S14, the control unit 200 performs misregistration correction by prediction, as described below. Note that downtime does not occur in the misregistration correction by prediction. First, in step S15, the control unit 200 determines the number of lines of the prediction value when the prediction value is converted into scan lines. The control unit 200 determines, in step S16, whether or not the number of correction lines calculated in step S15 is the same as the value calculated in previously-performed processing in step S15, and if the number of correction lines has changed, in step S17, the control unit 200 adjusts an image forming condition, i.e., an exposure timing in the present embodiment, based on the prediction value.

Figure 3A:
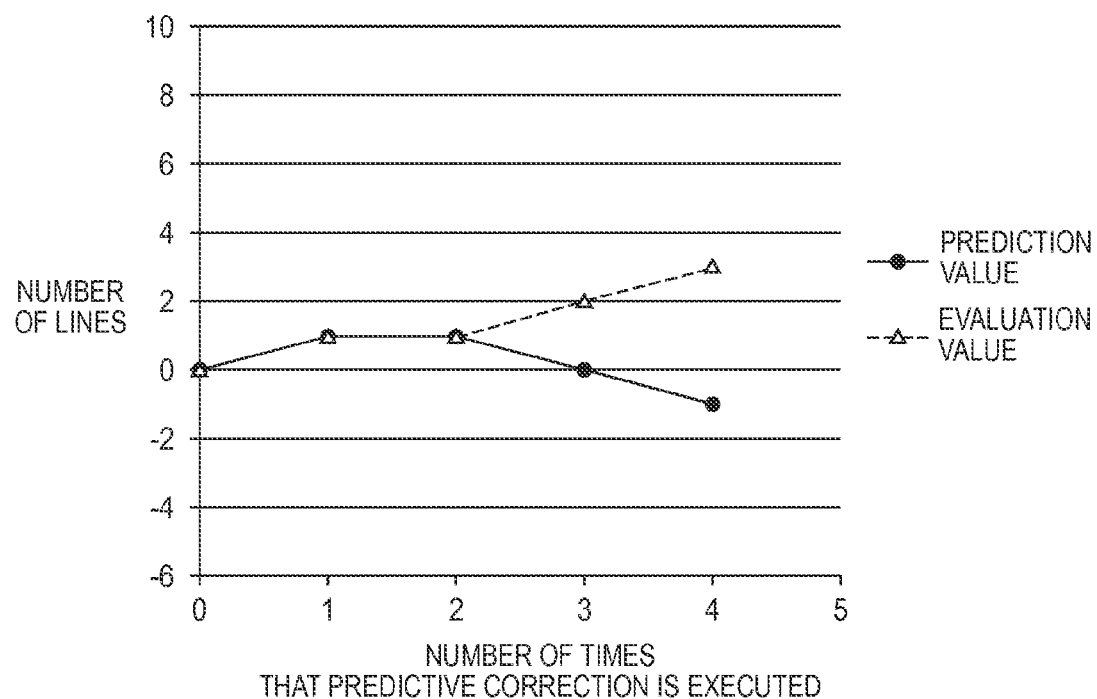
FIGS. 3A and 3B are diagrams showing relationships between the evaluation value and the prediction value according to an embodiment.
Figure 3B:
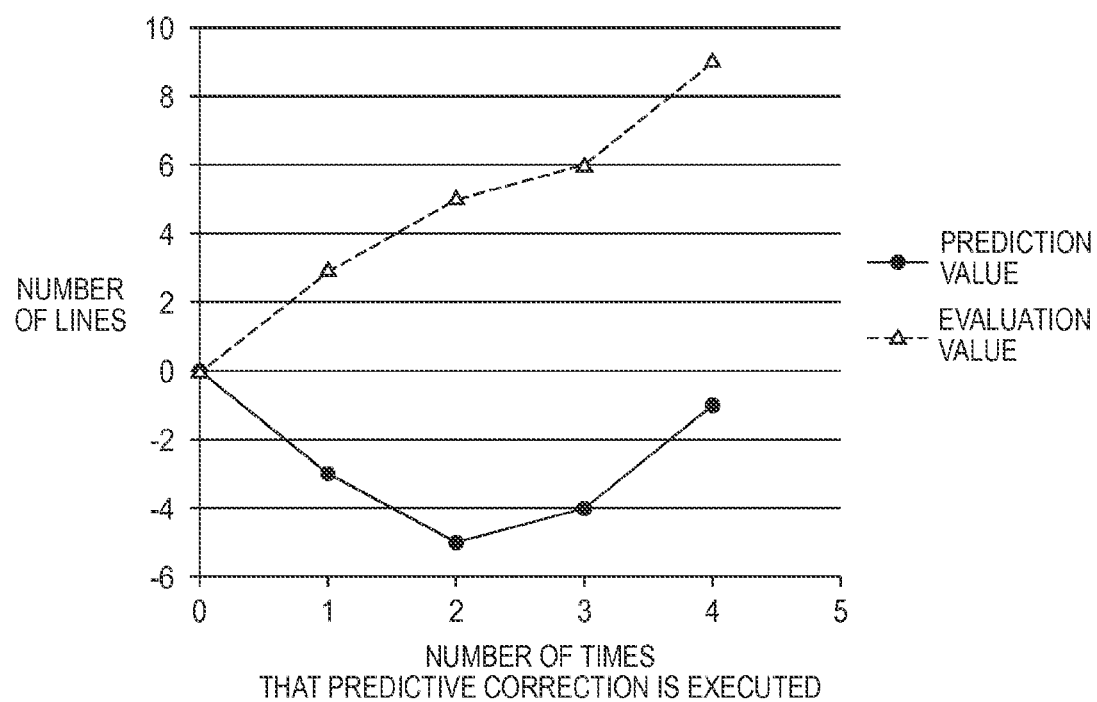

For example, assume that, after the calibration is executed, misregistration correction by prediction is executed four times by performing the processing in FIG. 2, and the variation values in the processing in step S12 at the respective times converted into scan lines are +1, 0, −1, and −1. In this case, the prediction values and the evaluation values are as shown in FIG. 3A. Similarly, assume that the variation values in step S12 at the respective times converted into scan lines are −3, −2, +1, and +3. In this case, the prediction values and the evaluation values are as shown in FIG. 3B. In both examples in FIGS. 3A and 3B, the prediction value at the time point at which the misregistration correction by prediction has been executed four times is −1. However, a prediction error, i.e., a difference between the misregistration amount that has actually occurred and the prediction value depends on the change that has been made until now since the calibration is performed. That is to say, the prediction error at the time point at which the misregistration correction by prediction has been executed four times may possibly be different between FIG. 3A and FIG. 3B. Accordingly, in the present embodiment, an accumulated value of the absolute value of the variation value is used, rather than a simple accumulated value of the variation value, i.e., the prediction value, in order to evaluate the prediction error. This is because the prediction error can be estimated to be larger as the variation value at each time is larger. In step S14 in FIG. 2, the necessity for the calibration is determined using the evaluation value. With this configuration, degradation of image quality as a result of the prediction error becoming large can be prevented.

Note that, although the processing in FIG. 2 is performed for each color, the misregistration correction using the detection pattern in step S18 is performed for all colors. For example, a configuration may be employed in which the calibration is performed in step S18 if the evaluation value regarding any of the colors used in image formation exceeds the first threshold value. A configuration may also be employed in which the calibration is performed in step S18 if the evaluation value regarding any of one or more predetermined colors exceeds the first threshold value.

Figure 5A:
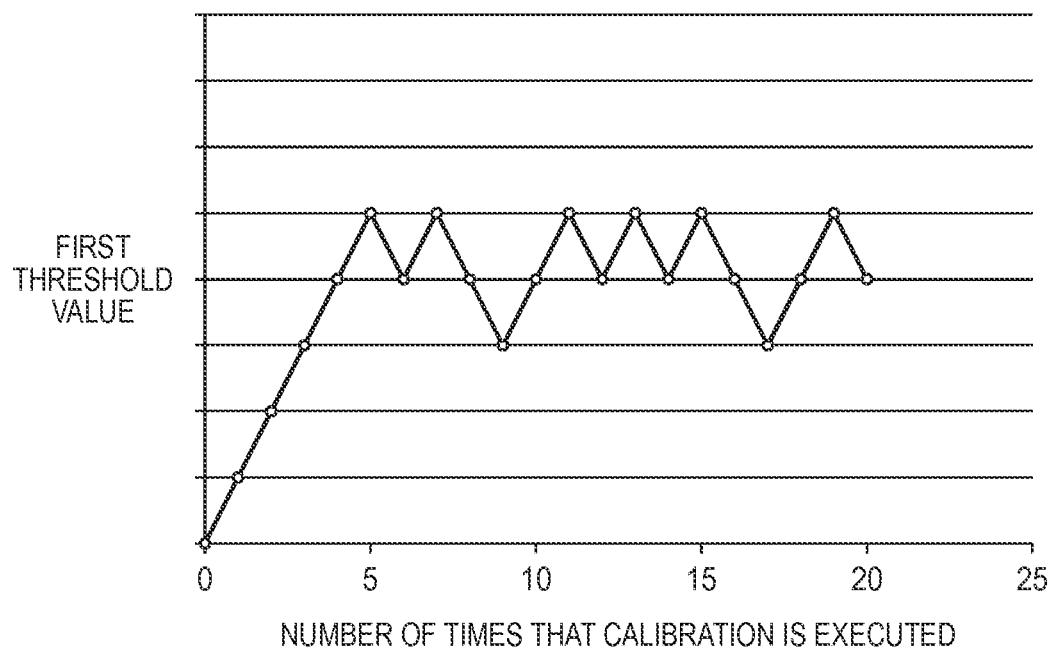
FIGS. 5A and 5B are diagrams showing transitions of a first threshold value according to an embodiment.

Note that the execution frequency of the calibration varies depending on the magnitude of the first threshold value. Specifically, the execution frequency of the calibration is higher as the first threshold value is set smaller, and the execution frequency of the calibration is lower as the first threshold value is set larger. Accordingly, the execution frequency of the calibration can be set in accordance with individual characteristics by appropriately setting the first threshold value based on individual differences of the image forming apparatus. For this reason, in the present embodiment, the first threshold value is updated after the calibration is executed in step S18 in FIG. 2. FIG. 4 is a flowchart of the calibration performed in step S18 in FIG. 2. In step S20, the control unit 200 forms the detection pattern on the intermediate transfer belt 34, and in step S21, the control unit 200 detects the detection pattern using the sensors 100 and measures the misregistration amount. In step S22, the control unit 200 adjusts an image forming condition, e.g., an exposure timing of the photosensitive member 12 or the like, based on the measurement value of the misregistration amount, so as to reduce the misregistration. Thereafter, in step S23, the control unit 200 compares the measurement value of the misregistration amount in step S21 with the prediction value in step S13 in FIG. 2 to calculate the prediction error, and compares the prediction error with a second threshold value in step S24. If the prediction error is smaller than or equal to the second threshold value, it can be determined that the characteristics of this image forming apparatus are suitable for the prediction algorithm. Accordingly, in step S26, the control unit 200 increases the first threshold value by a predetermined value so as to reduce the execution frequency of the calibration. On the other hand, if the prediction error is larger than the second threshold value, it can be determined that the characteristics of this image forming apparatus are not very suitable for the prediction algorithm. Accordingly, in step S25, the control unit 200 decreases the first threshold value by a predetermined value so as to increase the execution frequency of the calibration. With this configuration, the execution frequency of the calibration can be set in accordance with the individual characteristics. Lastly, in step S27, the control unit 200 initializes the prediction value and the evaluation value to zero as a result of executing the calibration. Note that a configuration may be employed in which an upper limit value of the first threshold value is provided in order to prevent the first threshold value from becoming too large. FIG. 5A shows a state where the first threshold value converges to a value suitable for the individual characteristics, as a result of execution of the calibration. Note that, in FIG. 5A, the initial value of the first threshold value is set at the time of shipping from the factory, for example.

Figure 8A:
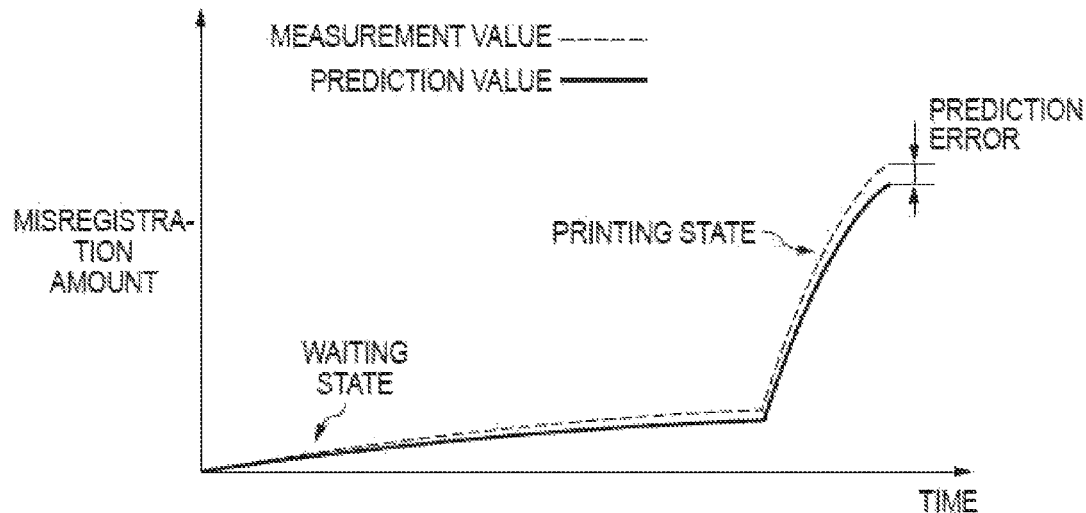
FIGS. 8A and 8B are diagrams illustrating that a prediction error differs depending on progress of the operation state.
Figure 8B:
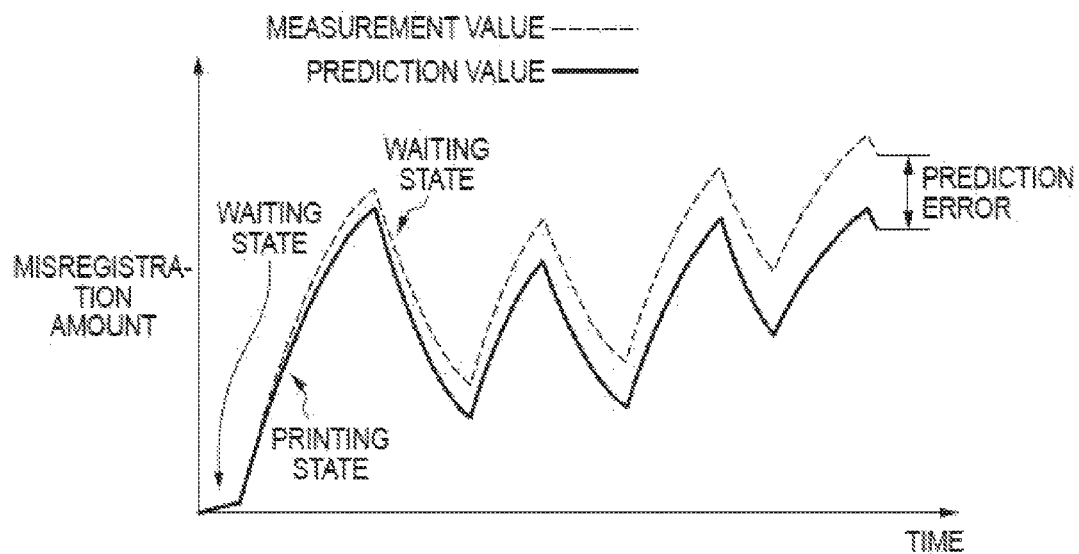

FIG. 1 shows the evaluation value in addition to the measurement value and the prediction value in FIG. 8B. As shown in FIG. 1, the calibration is executed upon the evaluation value exceeding the first threshold value. The first threshold value is changed based on the prediction error. Note that, in the flowchart in FIG. 4, the first threshold value is decreased if the prediction error is larger than the second threshold value, and the first threshold value is increased if the prediction error is smaller than or equal to the second threshold value. However, a configuration may also be employed in which a second threshold value and a third threshold value smaller than the second threshold value are provided, the first threshold value is decreased if the prediction error is larger than the second threshold value, and the first threshold value is increased if the prediction error is smaller than the third threshold value. In this case, the first threshold value is not changed if the prediction error is larger than or equal to the third threshold value and smaller than or equal to the second threshold value.

A description will now be given, from a statistical aspect, of a calibration execution frequency reduction effect achieved by adjusting the first threshold value as shown in the flowchart in FIG. 4. Assume that the distribution of the prediction error of each manufactured image forming apparatus is a normal distribution. Also assume that the initial value of the first threshold value is selected such that all individuals within the range of ±2σ (95.45% of the total) satisfy predetermined quality. If the first threshold value is not to be updated, in the individuals of 68.27% located within the range of ±σ, the calibration will be executed more than twice as frequently with respect to the characteristics of these products. In contrast, by adjusting the first threshold value, the execution frequency of the calibration converges to a frequency suitable for individual differences.

Second Embodiment

Figure 7:
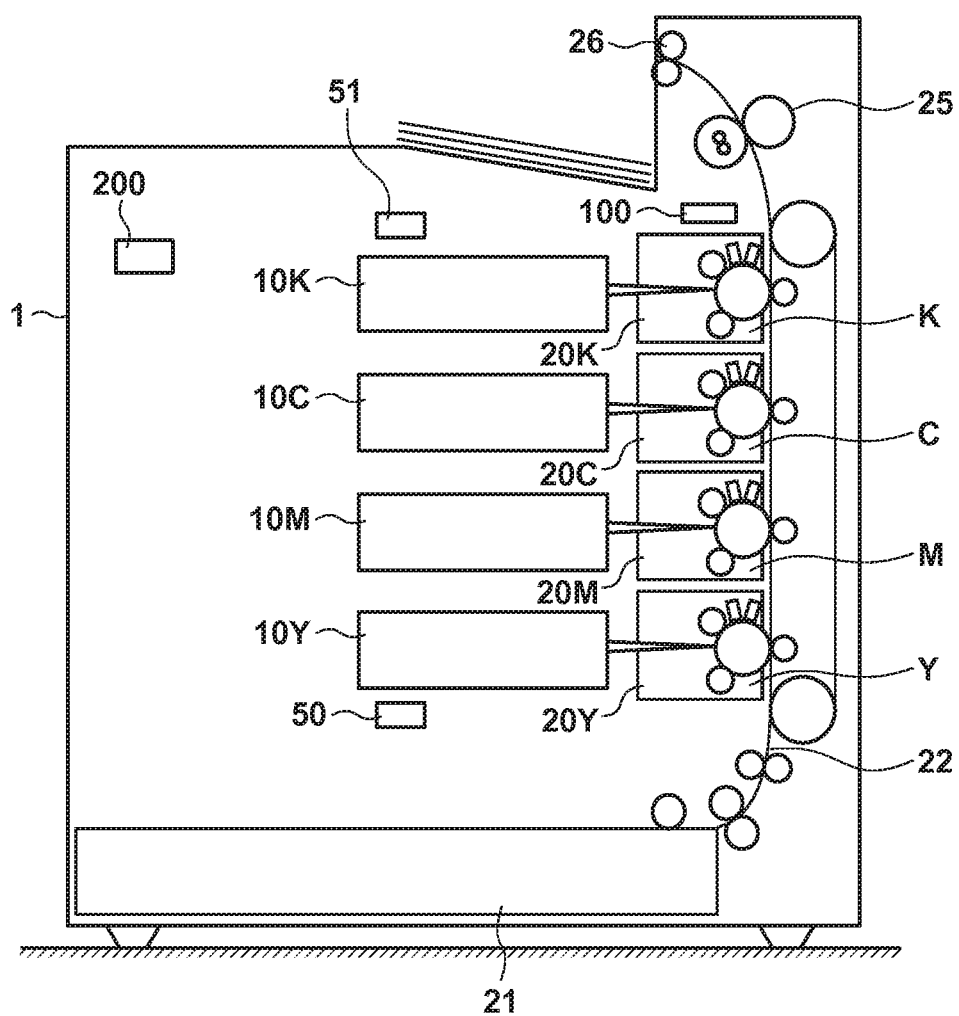
FIG. 7 is a diagram showing a configuration of an image forming apparatus according to an embodiment.

In the first embodiment, the misregistration amount is predicted based on an operation state of the image forming apparatus. In the present embodiment, the misregistration amount is predicted using a measured temperature of the inside of the image forming apparatus. FIG. 7 is a diagram showing a configuration of the image forming apparatus according to the present embodiment. Note that similar constituent elements of the image forming apparatus in FIG. 6 will be given the same reference numerals, and a description thereof will be omitted. In the present embodiment, optical units 10 are provided separately for respective colors, and furthermore, temperature sensors 50 and 51 for detecting the atmospheric temperature of the space are provided above and below the space where the optical units 10K to 10Y are arranged. The control unit 200 predicts the amount of color shift based on a difference of the temperature measured by one of the temperature sensors 50 and 51 (in the present embodiment, based on a change of the result of the detection of the temperature sensor 50). Note that any of various methods are available for the prediction of the misregistration amount based on the temperature. Note that the evaluation value is obtained as in the first embodiment.

Figure 5B:
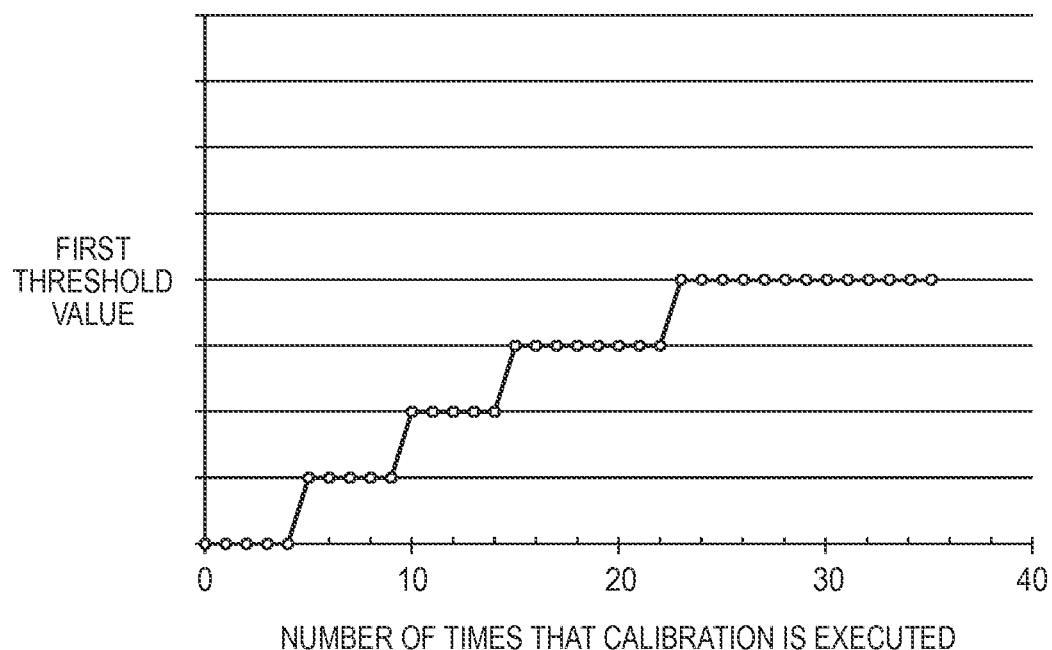

In the present embodiment, the processing for adjusting the first threshold value is different from that in the first embodiment. Initially, the prediction error is compared with a threshold value, and is evaluated on a scale of three grades. Here, the grades are "small", "middle", and "large". The control unit 200, after executing the calibration five times, determines whether to increase the first threshold value, to decrease the first threshold value, or keep the current first threshold value, based on an evaluation result at each time. For example, a configuration may be employed in which the first threshold value is increased if the prediction error is evaluated as "small" three or more times out of five times, the first threshold value is decreased if the prediction error is evaluated as "large" three or more times out of five times, and the first threshold value is not changed in other cases. FIG. 5B shows a state where the first threshold value converges to a value suitable for the individual characteristics as a result of execution of the calibration. In the present embodiment, it is determined whether to increase, decrease, or keep the first threshold value, every five times the calibration is executed. Note that the number of times, which is five here, is an example, and any predetermined number of times may be used as a unit for the determination of whether to update the first threshold value. The evaluation scale or the like is not limited to three grades either.

Note that the calibration in the above embodiments is executed if the evaluation value is larger than the first threshold value, whereas a configuration may be employed in which the calibration is additionally executed under other conditions. For example, the calibration may be executed when the apparatus is powered on or in accordance with an instruction from a user, regardless of which of the evaluation value and the first threshold value is larger or smaller. In the above embodiments, the accumulated value of the absolute value of the variation value is used as the evaluation value of the prediction error. However, other values calculated based on the variation value may also be used as the evaluation value. Furthermore, the prediction value obtained by considering the positive or negative of the variation value may also be used as the evaluation value. This is because the prediction error is obtained and the first threshold value is changed when the calibration is executed, and accordingly the execution frequency of the calibration is adjusted based on the actual prediction error and an increase in the prediction error can thereby be suppressed.

Although the misregistration correction by prediction is performed at any time in the above embodiments, whereas a configuration may also be employed in which the misregistration correction by prediction is also performed if the evaluation value, the prediction value or the variation value exceeds a predetermined amount. Various values other than the operation state and the temperature may also be used in the prediction of a misregistration. Furthermore, the present invention is not limited to misregistration correction, and is applicable to any correction control related to image quality. For example, the present invention is applicable to a configuration in which a density characteristic of an image is targeted and a change thereof is predicted, i.e., density correction. In this case, the correction amount is a difference between a target density and a formed density, or a difference between a target density and a density predicted to be formed.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-094046, filed on Apr. 30, 2014, which is hereby incorporated by reference herein in its entirety.

What is claimed is:

1. An image forming apparatus comprising:
an image forming unit configured to form an image on an image carrier, using a plurality of colors;
a detection unit configured to detect a detection pattern formed by the image forming unit;
a first correction unit configured to correct an image forming condition based on a measurement value of a correction amount related to a misregistration amount or density obtained according to a detection result by the detection unit;
a second correction unit configured to estimate a variation amount of the correction amount at a predetermined timing, obtain a prediction value by accumulating the variation value since the first correction unit performed the correction, and correct the image forming condition based on the prediction value; and
a determination unit configured to obtain an evaluation value related to a prediction error based on the variation value since the first correction unit performed the correction, and determine whether or not the correction by the first correction unit is performed by comparing the evaluation value and a first threshold.

2. The image forming apparatus according to claim 1, wherein the second correction unit is further configured to repeat, at the predetermined timing, the estimation of the variation value since the previous predetermined time, and calculate the prediction value since the first correction unit performed the correction.

3. The image forming apparatus according to claim 1, wherein the evaluation value is a value obtained by accumulating an absolute value of the variation value since the first correction unit performed the correction.

4. The image forming apparatus according to claim 1, wherein the determination unit is further configured to determine that the correction by the first correction unit is performed, if the evaluation value exceeds the first threshold value.

5. The image forming apparatus according to claim 4, further comprising an updating unit configured to calculate an error value using the measurement value acquired by the first correction unit and the prediction value obtained by the second correction unit, upon the first correction unit performing the correction, and update the first threshold value in accordance with the error value.

6. The image forming apparatus according to claim 5, wherein the updating unit is further configured to decrease the first threshold value if the error value is larger than a second threshold value.

7. The image forming apparatus according to claim 6, wherein the updating unit is further configured to increase the first threshold value if the error value is smaller than a third threshold value, and the third threshold value is smaller than the second threshold value.

8. The image forming apparatus according to claim 6, wherein the updating unit is further configured to increase the first threshold value if the error value is smaller than the second threshold value.

9. The image forming apparatus according to claim 5, wherein the updating unit is further configured to calculate the error value every time the first correction unit performs the correction, and determines, upon the first correction unit performing the correction a predetermined number of times, whether or not to update the first threshold value based on the error value obtained at each time.

10. The image forming apparatus according to claim 1, wherein the correction amount is a difference between a target density and a density formed by the image forming unit or a density estimated to be formed by the image forming unit.

11. The image forming apparatus according to claim 1, wherein the second correction unit is further configured to select an algorithm for estimating the variation value or a parameter to be used in the algorithm, in accordance with an operation state of the image forming apparatus at the predetermined timing.

12. The image forming apparatus according to claim 1, wherein the second correction unit is further configured to estimate the variation value based on a temperature of the image forming apparatus.

13. The image forming apparatus according to claim 1, wherein the prediction value is an accumulated value of the variation value by considering a positive and a negative sign of the variation value.

14. An image forming apparatus comprising:
an image forming engine that forms an image on an image carrier, using a plurality of colors;
a sensor configured to detect a detection pattern formed by the image forming engine;
a processor; and
a memory, the memory storing code implemented by the processor to cause the processor to perform the steps of:
correcting an image forming condition based on a measurement value of a correction amount related to a misregistration amount or density obtained according to a detection result by the sensor,
estimating a variation value of the correction amount at a predetermined timing, obtaining a prediction value by accumulating the variation value since performing the correction of the image forming condition, and correcting the image forming condition based on the prediction value, and
obtaining an evaluation value related to a prediction error based on the variation value since performing the correction of the image forming condition, and determining whether or not to perform the correction by comparing the evaluation value and a first threshold.

15. The image forming apparatus according to claim 14, wherein the processor further repeats, at the predetermined timing, the estimation of the variation value since the previous determined time, and calculates the prediction value since performing the correction of the image forming condition.

16. The image forming apparatus according to claim 14, wherein the evaluation value is a value obtained by accumulating an absolute value of the variation value since performing the correction of the image forming condition.

17. The image forming apparatus according to claim 14, wherein the processor further determines that the correction of the image forming condition is performed, if the evaluation value exceeds the first threshold value.

18. The image forming apparatus according to claim 17, wherein the processor further calculates an error value using the measurement value and the prediction value, upon performing the correction of the image forming condition, and updates the first threshold value in accordance with the error value.

19. The image forming apparatus according to claim 18, wherein the processor further decreases the first threshold value if the error value is larger than a second threshold value.

20. The image forming apparatus according to claim 19, wherein the processor further increases the first threshold value if the error value is smaller than a third threshold value, and the third threshold value is smaller than the second threshold value.

* * * * *